(12) United States Patent
Miranda

(10) Patent No.: US 10,856,543 B1
(45) Date of Patent: Dec. 8, 2020

(54) RODENT REPELLING SIDING

(71) Applicant: Francisco Miranda, Portland, OR (US)

(72) Inventor: Francisco Miranda, Portland, OR (US)

( * ) Notice: Subject to any disclaimer, the term of this patent is extended or adjusted under 35 U.S.C. 154(b) by 0 days.

(21) Appl. No.: 16/562,676

(22) Filed: Sep. 6, 2019

(51) Int. Cl.
| | |
|---|---|
| *A01M 29/12* | (2011.01) |
| *E04F 13/07* | (2006.01) |
| *A01M 29/30* | (2011.01) |
| *E04F 13/077* | (2006.01) |
| *E04F 13/073* | (2006.01) |

(52) U.S. Cl.
CPC ............ *A01M 29/12* (2013.01); *A01M 29/30* (2013.01); *E04F 13/077* (2013.01); *E04F 13/0733* (2013.01)

(58) Field of Classification Search
CPC ...... A01M 29/12; A01M 29/30; E04F 13/077; E04F 13/0733
USPC ........................................................ 52/173.1
See application file for complete search history.

(56) References Cited

U.S. PATENT DOCUMENTS

| | | | |
|---|---|---|---|
| 5,150,722 A | 9/1992 | Rutherford | |
| 6,875,102 B2 * | 4/2005 | Achen | F24F 13/082 454/276 |
| 7,845,109 B2 * | 12/2010 | Peterson | A01C 21/002 47/48.5 |
| 8,020,341 B2 | 9/2011 | Ramos-Santiago | |
| 8,695,303 B2 | 4/2014 | Swanson | |
| D742,552 S | 11/2015 | Swanson | |
| 2006/0102737 A1 | 5/2006 | Harmon | |
| 2006/0130391 A1 * | 6/2006 | Livingston | A01M 29/12 43/124 |
| 2008/0134590 A1 * | 6/2008 | Marr | E04B 1/72 52/101 |
| 2010/0088987 A1 | 4/2010 | Monteer | |
| 2017/0245467 A1 | 8/2017 | Greiner | |

FOREIGN PATENT DOCUMENTS

| | | | | |
|---|---|---|---|---|
| GB | 2496741 A | * | 5/2013 | ............. A01N 65/00 |
| WO | WO2006124121 | | 11/2006 | |

* cited by examiner

*Primary Examiner* — Jeanette E Chapman

(57) ABSTRACT

A rodent repelling siding for repelling rodents from entering a structure includes a siding housing having a wall side, a top side, a front side, and a bottom side forming an inner compartment. The front side has a plurality of vent slots extending through to the inner compartment. The wall side s configured to be coupled to an outside wall of a structure with the bottom side disposed on the ground. An absorbent insert is coupled within the inner compartment. The absorbent insert is configured to absorb a chemical repellant and release a repellant odor therefrom. The repellant odor passes through the plurality of vent slots.

7 Claims, 4 Drawing Sheets

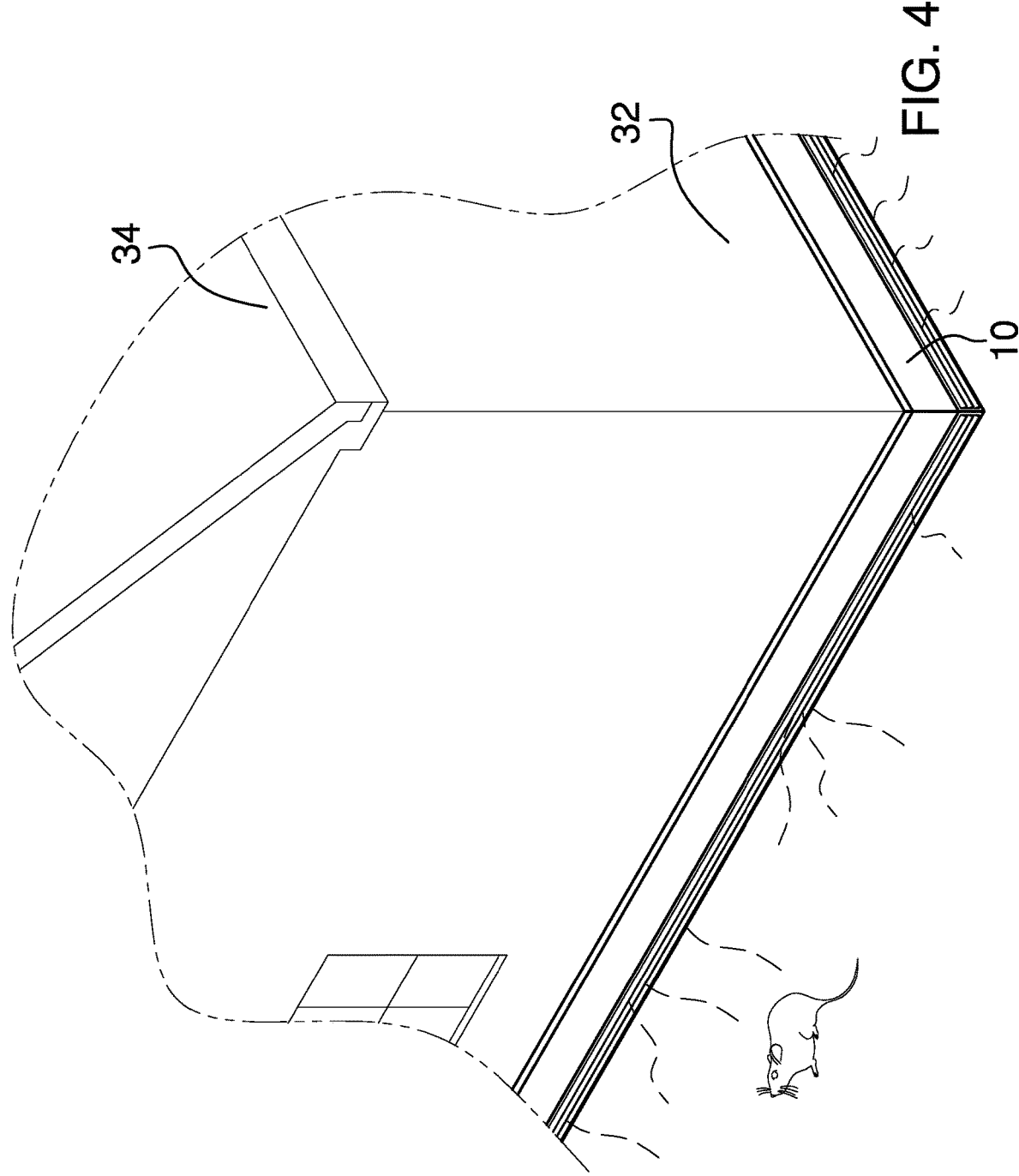

RODENT REPELLING SIDING

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to rodent prevention apparatus and more particularly pertains to a new rodent prevention apparatus for repelling rodents from entering a structure.

BRIEF SUMMARY OF THE INVENTION

An embodiment of the disclosure meets the needs presented above by generally comprising a siding housing having a wall side, a top side, a front side, and a bottom side forming an inner compartment. The front side has a plurality of vent slots extending through to the inner compartment. The wall side s configured to be coupled to an outside wall of a structure with the bottom side disposed on the ground. An absorbent insert is coupled within the inner compartment. The absorbent insert is configured to absorb a chemical repellant and release a repellant odor therefrom. The repellant odor passes through the plurality of vent slots.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 4 is an in-use view of an embodiment of the disclosure.

DETAILED DESCRIPTION OF THE INVENTION

Figure 1:
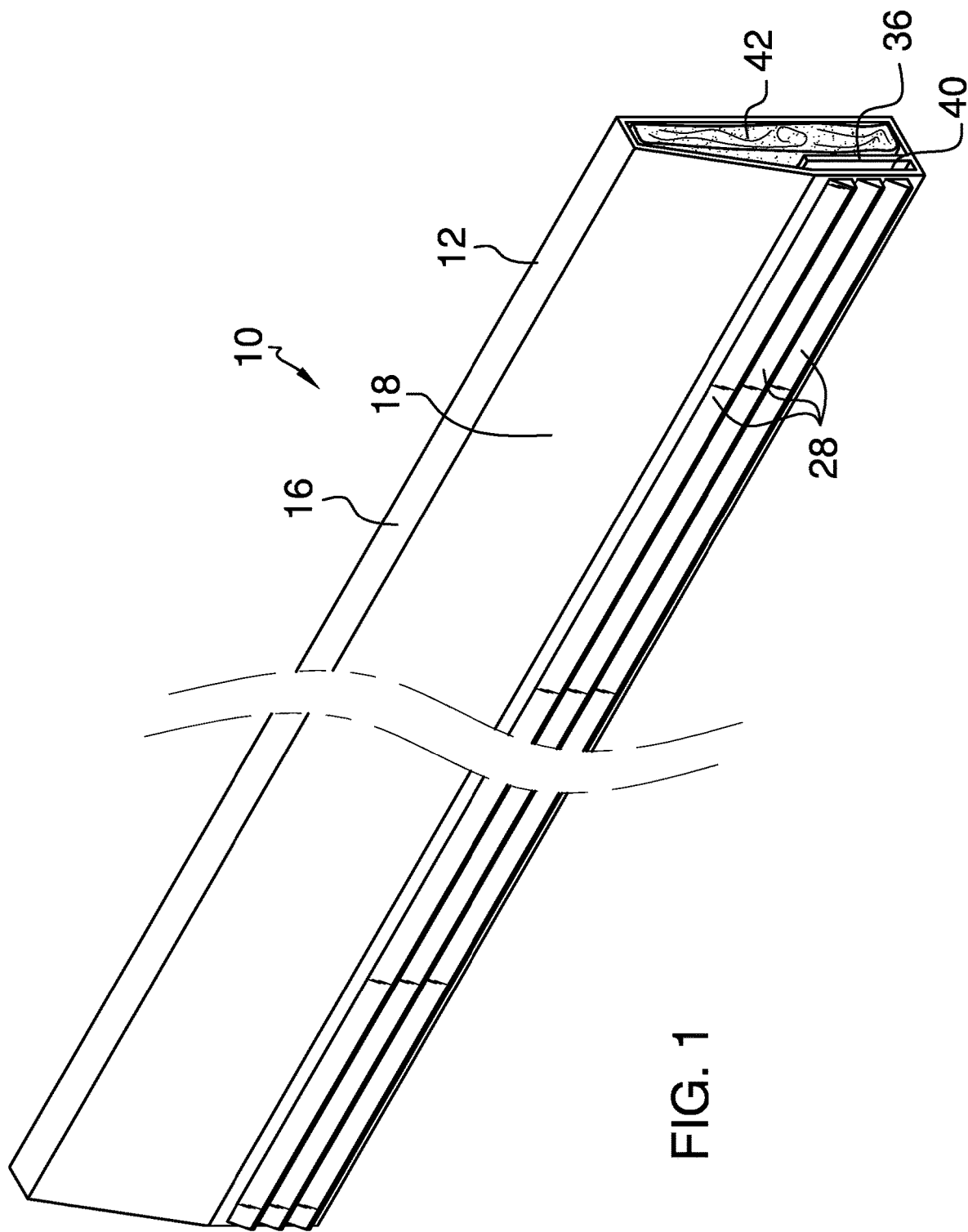
FIG. 1 is an isometric view of a rodent repelling siding according to an embodiment of the disclosure.
Figure 2:
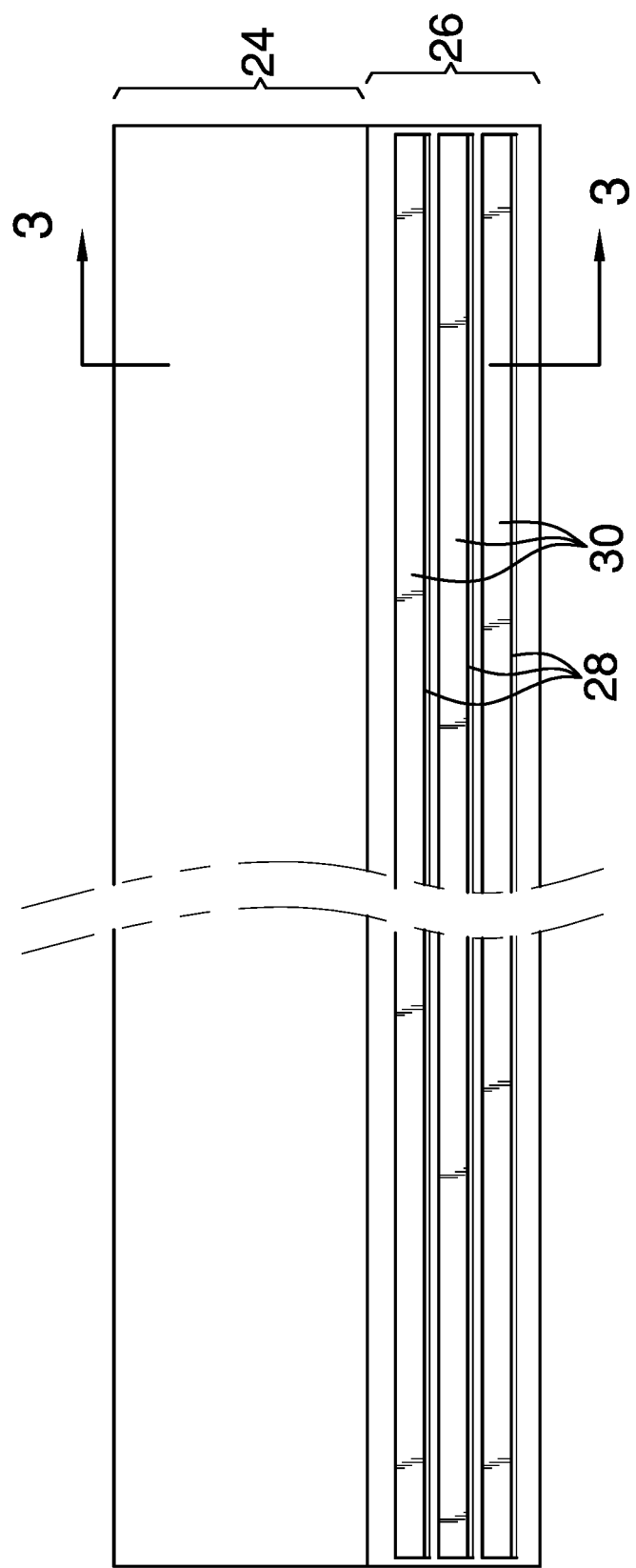
FIG. 2 is a front elevation view of an embodiment of the disclosure.
Figure 3:
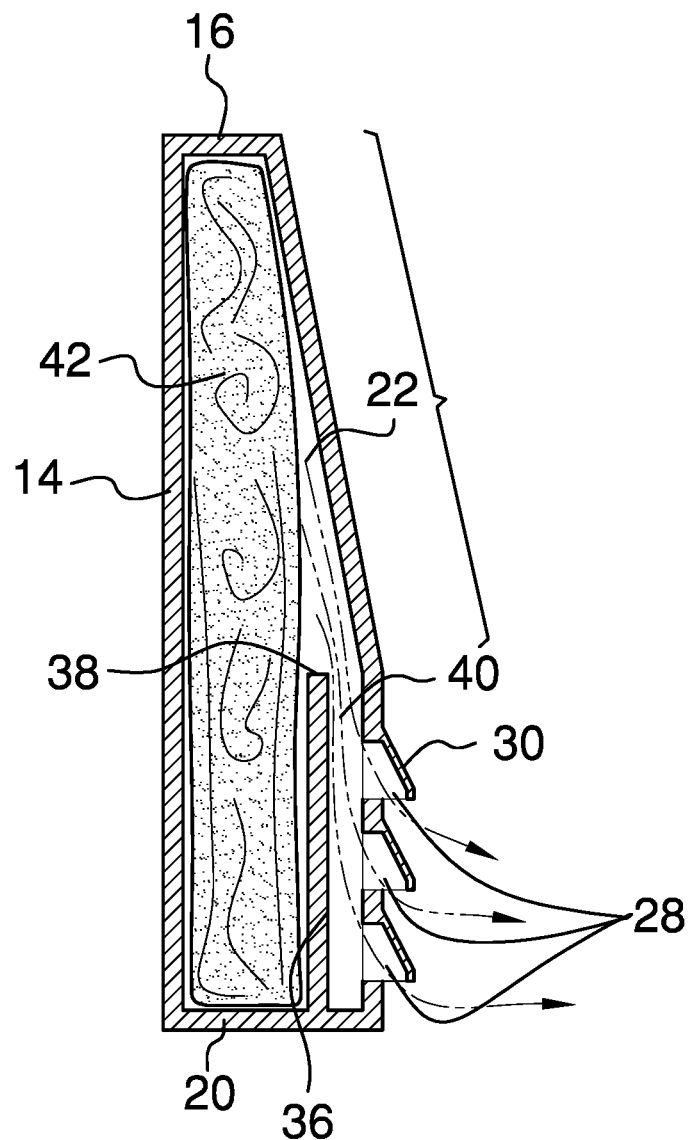
FIG. 3 is a cross-sectional view of an embodiment of the disclosure along line 3-3 of FIG. 2.

With reference now to the drawings, and in particular to FIGS. 1 through 4 thereof, a new rodent prevention apparatus embodying the principles and concepts of an embodiment of the disclosure and generally designated by the reference numeral 10 will be described.

As best illustrated in FIGS. 1 through 4, the rodent repelling siding 10 generally comprises a siding housing 12 housing having a wall side 14, a top side 16, a front side 18, and a bottom side 20 forming an inner compartment 22. The front side 18 may have an angled upper portion 24 and a vertical lower portion 26. The front side 18 has a plurality of vent slots 28 extending through the vertical lower portion 26 to the inner compartment 22. Each of the plurality of vent slots 28 may have a louver 30 oriented towards the ground. The wall side 14 is configured to be coupled to an outside wall 32 of a structure 34 with the bottom side 20 being disposed on the ground.

A divider wall 36 may be perpendicularly coupled to the bottom side 20 within the inner compartment 22. The divider wall 36 has a top end 38 aligned with the union of the angled upper portion 24 and the vertical lower portion 26 of the front side. The divider wall 36 forms an odor pathway 40 between the divider wall 36 and the front side 18. An absorbent insert 42 is coupled to the siding housing 12 within the inner compartment 22 between the wall side 14 and the divider wall 36. The absorbent insert 42 may extend from the bottom side 20 to the top side 16 and from the wall side 14 to the divider wall 36. The absorbent insert 42 absorbs a chemical repellant to release a repellant odor therefrom. The repellant odor passes through the odor pathway 40 and the plurality of vent slots 28. The louver 30 of each of the plurality of vent slots 28 directs the repellant odor towards the ground to maximize efficacy in repelling rodents.

In use, the siding housing 12 is coupled around the entire perimeter of the structure 34. Rodents are thus repelled from entering the structure 34 due to the repellant odor 40 coming through the plurality of vent slots 28 regardless of where they approach from.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A rodent repelling siding comprising:
   a siding housing, the siding housing having a wall side, a top side, a front side, and a bottom side forming an inner compartment, the front side having a plurality of vent slots extending through to the inner compartment, the wall side being configured to be coupled to an outside wall of a structure, the bottom side being disposed on the ground, the front side of the siding housing having an angled upper portion and a vertical lower portion, the plurality of vent slots extending through the vertical lower portion;
   an absorbent insert coupled to the siding housing, the absorbent insert being coupled within the inner compartment;
   a chemical repellant absorbed into the absorbent insert to release a repellant odor therefrom, the repellant odor passing through the plurality of vent slots; and
   a divider wall coupled to the siding housing, the divider wall being perpendicularly coupled to the bottom side within the inner compartment, the divider wall having a top end aligned with the union of the angled upper portion and the vertical lower portion of the front side, the absorbent insert being coupled between the wall side and the divider wall, the divider wall forming an odor pathway between the divider wall and the front side.

2. The rodent repelling siding of claim 1 further comprising each of the plurality of vent slots having a louver.

3. The rodent repelling siding of claim 2 further comprising the louver of each of the plurality of vent slots being oriented towards the ground.

4. The rodent repelling siding of claim 1 further comprising a divider wall coupled to the siding housing, the divider wall being coupled to the bottom side within the inner compartment, the absorbent insert being coupled between the wall side and the divider wall, the divider wall forming an odor pathway between the divider wall and the front side.

5. The rodent repelling siding of claim 1 further comprising the absorbent insert extending from the bottom side to the top side and from the wall side to the divider wall.

6. The rodent repelling siding of claim 1 further comprising the plurality of vent slots being three vent slots.

7. A rodent repelling siding comprising:
   a siding housing, the siding housing having a wall side, a top side, a front side, and a bottom side forming an inner compartment, the front side having an angled upper portion and a vertical lower portion, the front side having a plurality of vent slots extending through the vertical lower portion to the inner compartment, each of the plurality of vent slots having a louver oriented towards the ground, the wall side being configured to be coupled to an outside wall of a structure, the bottom side being disposed on the ground;
   a divider wall coupled to the siding housing, the divider wall being perpendicularly coupled to the bottom side within the inner compartment, the divider wall having a top end aligned with the union of the angled upper portion and the vertical lower portion of the front side, the divider wall forming an odor pathway between the divider wall and the front side;
   an absorbent insert coupled to the siding housing, the absorbent insert being coupled within the inner compartment between the wall side and the divider wall, the absorbent insert extending from the bottom side to the top side and from the wall side to the divider wall; and
   a chemical repellant absorbed into the absorbent insert to release a repellant odor therefrom, the repellant odor passing through the odor pathway and the plurality of vent slots.

* * * * *